United States Patent
Clarke

[15] 3,639,131
[45] Feb. 1, 1972

[54] PERFORMANCE AND STORAGE LIFE OF RAIN REPELLENTS

[72] Inventor: David W. Clarke, Renton, Wash.
[73] Assignee: The Boeing Company, Seattle, Wash.
[22] Filed: June 15, 1970
[21] Appl. No.: 46,458

[52] U.S. Cl................106/2, 106/13, 106/287 SB, 117/135.1, 117/135.5
[51] Int. Cl. ................C09k 3/18
[58] Field of Search..........106/2, 13, 287 C; 117/135.1, 117/135.5

[56] References Cited

UNITED STATES PATENTS 2,991,204 7/1961 Astle................148/6.27 X
3,460,981 8/1969 Keil et al..............106/13 X
3,516,854 6/1970 Curry..............117/135.5 X Primary Examiner—Lorenzo B. Hayes
Attorney—Glenn Orlob and Kenneth W. Thomas

[57] ABSTRACT

An alcohol and water solution of a silicone polymer consisting of an acid neutralized cationic polysiloxane copolymer containing amino functional groups is heated in an enclosed aluminum container to form a barrier coating inside the container and to enhance the performance characteristics of the polymer in imparting visibility through a transparent surface during water impingement.

4 Claims, No Drawings

PERFORMANCE AND STORAGE LIFE OF RAIN REPELLENTS

Rain repellents are finding widespread use on vehicles wherein the repellent is applied to the surface of the windshield to form a hydrophobic film. The film is transparent, it prevents rain from building up on the surface, and thereby maintains excellent visibility through the windshield even in a heavy rainstorm. The repellent should have a storage life of several months without losing its effectiveness when placed in use.

Rain repellents of an acid neutralized cationic dimethyl polysiloxane polymer containing amino functional groups are among the best of the rain repellents. These repellents in lower alcohol-water solutions may be stored in stainless steel, in glass, or in inert plastic containers and have a good storage life. These diluted repellents could not be stored in aluminum containers prior to this invention as the copolymer reacts with the aluminum and thereby loses its effectiveness in a matter of days.

For marketing and usage advantages, it is often desirable to store the repellent in pressurized aluminum aerosol containers, therefore, attempts were made to line the containers to form a barrier which will prevent interaction with the aluminum and the repellent. Several organic and organosilicon linings were introduced into aluminum aerosol containers. Even the best of these coatings prevented the metal and repellent from interacting for no more than several weeks. A sulfuric acid anodized coating applied to the interior of aluminum containers gave only a limited storage life when used as a container for these rain repellents. It is known that a corrosion resistant film can be imparted to the inside of aluminum containers by placing about a 0.01 to 0.1 normal solution of triethanolamine or of ammonium hydroxide inside the containers and heating from about 98° to 160° C. (208°–320° F.) for 5 minutes with maximum corrosion protection obtained after 4 hours. Aluminum aerosol containers were treated thus with triethanolamine, with ammonium hydroxide and with various other dilute solutions of other lower amines. Rain repellents stored in containers so treated were degraded after about a month of storage.

None of the usual methods of coating an aluminum container to render it corrosion resistant are effective in preventing interaction between the rain repellent and the container. It appears that all of the coatings are porous.

It was discovered that a dense, nonporous, barrier coating can be obtained by heating the water alcohol solution of rain repellent in the enclosed aluminum container. The repellent may then be stored in the same container; it has a good storage life and the performance characteristics are enhanced. The container with repellent is heated for a time sufficient to build a coating on the inside of the container. The length of time at temperature varies with the temperature. Slightly elevated temperatures require considerable time at temperature. At higher temperatures the coating is obtained in a shorter period. An effective coating may be built up and repellency performance characteristics enhanced by heating at 130° F. for 3 months, by heating at 160° F. for 5 days, by heating at 300° F. for 30 minutes and by heating at various temperatures and times between these figures.

An object of this invention is to obtain adequate storage life for an acid neutralized cationic polysiloxane polymer containing amino functional groups when diluted in water-alcohol solutions and stored in an aluminum container.

Another object is to impart improved performance characteristics to a polysiloxane rain repellent.

Yet another object is to coat the inside of an aluminum container to obtain a pinhole-free impervious coating.

An acid neutralized cationic dimethyl polysiloxane polymer containing amino functional groups when diluted in a mixture of lower alcohol and water and stored in an enclosed aluminum container at room temperature for a few days loses its effectiveness as a material for retaining transparency through a transparent material subjected to water impingement. The container remains bright and shiny. When the solution and container are heated to a temperature of about 130° F. to 300° F. and are held at the elevated temperature for sufficient time, a dull gray coat is built up in the container in both the liquid and the vapor phase. This treatment is also effective in aluminum containers having a stainless steel valve assembly. The coat formed is dense and pinhole free. It shows a resistance of over a million ohms when tested by a DC ohmmeter. It prevents interaction between the polymer and the aluminum to give storage life of 2 years or more to the repellent fluid when stored in the treated aluminum container.

At the same time that the coating is being formed a change is taking place in the copolymer such that its effective film life is lengthened when applied to a transparent surface. The same change to the copolymer takes place when the water-alcohol diluted polymer is heated in glass, in stainless steel or in an inert plastic container such as polyethylene to which aluminum particles have been added. Its performance is not enhanced by heating in these containers unless aluminum is present.

EXAMPLE 1

A rain-repellent fluid comprising 84 weight percent distilled water, 14 weight percent isopropanol (99 percent) and 2 weight percent of the following composition: 43.0 parts (by weight) of a hydroxylated polydimethylsiloxane having an average molecular weight of about 2,000; 4.2 parts, (by weight) of n-(dimethoxymethylsilylisobutyl) ethylene diamine; 3.0 parts (by weight) of glacial acetic acid; and 49.8 parts (by weight) of tertiary butanol was placed in a seamless aerosol can of ANS (American National Standards) H35.1–1969, 1100 series alloy aluminum having a AISI (American Iron and Steel Institute), 300 series stainless steel valve. The cans were treated by heating at various temperatures then cooled to ambient temperature. The treated fluid was then applied to a section of glass which was being subjected to simulated rainfall at 1.4 inches per hour, driven by a stream of air at about 100 knots. The glass was inclined at 45° to the direction of the flow of air. Visibility performance was as shown in table 1. It illustrates the effectiveness of the heat treating process in imparting shelf life and in enhancing the performance characteristics of the fluid.

TABLE 1

| Heat Treatment | Time in Storage | Film Life Minutes of Good Visibility |
| --- | --- | --- |
| None |  | 7.6 |
| None | 6 Days | 6.1 |
| None | 19 Days | Zero |
| 5 Hrs. at 225°F. | None | 14.2 |
| 10 Hrs. at 225 °F. | None | 9.1 |
| 10 Hrs. at 225° F. | 4 Mo. | 9.1 |

Visibility performance is determined by looking through an inclined transparent member toward impinging water. By looking toward a target in the background, the observer can judge the degree of visibility provided by the rain repellent fluid applied to the transparent member. For good visibility the water does not wet the window, but balls up in small droplets which are blown off by the moving air stream. This allows the eye to see between the drops and integrate in a manner similar to looking through a woven window screen. As the effectiveness of the repellent gradually decreases the size of the water drops on the surface increase, the drops grow "tails" to resemble "polliwogs," then the drops grow longer until at about 2 inches long they are termed "small rivulets." In time the "small rivulets" become "large rivulets" which eventually merge to form small stationary "wettable spots" of one-quarter inch or more in diameter. During this period visibility deteriorates from "excellent" to "good" to "fair."

By looking at the water formations racing off the window, instead of looking through at the target, the observer can estimate rather closely the rate at which the rain-repellent film is deteriorating, and can register the time from initial application until "polliwogs" or "rivulets," or "wettable spots" form.

EXAMPLE 2

Rain-repellent fluid was prepared, placed in an aluminum container and heat treated, all as in example 1. Observations were made as to film life performance of the rain repellent. Results of the observations are shown in table 2. All observations were discontinued after 30 minutes. Therefore, all tests showing 30 minutes were actually 30 minutes or more. N.A. indicated the information is not available. This table illustrates the increase in performance as a result of heat treatment.

TABLE 2

| Heat treatment | Time in storage | Time required to reach condition (min.) | | |
|---|---|---|---|---|
| | | 1″ polliwogs | Small rivulets | Wettable spots |
| None | None | NA | 7 | 20 |
| ½ hour at 225° F | do | 5 | 8 | 28 |
| 2 hours at 225° F | do | NA | 10 | 26 |
| 5 hours at 225° F | do | 10 | 13 | 30 |
| 10 hours at 225° F | do | 20 | 27 | 30 |
| ½ hour at 300° F | do | 5 | 10 | 26 |
| 1 hr. at 300° F | do | NA | 10 | 30 |
| 2 hours at 300° F | do | 15 | 20 | 30 |
| None | do | Zero | NA | NA |
| 5 hours at 225° F | 38 days | 12 | NA | NA |
| 2 hours at 300° F | do | 18 | NA | NA |
| None | None | 5 | 10 | 18 |
| 5 hours at 225° F | 8 months | 6 | 15 | NA |
| 2 hours at 300° F | do | 5 | 15 | NA |

EXAMPLE 3

A rain-repellent fluid comprising 84 weight percent distilled water, 14 weight percent isopropanol (99 percent) and 2 weight percent of the following composition: 43.0 parts (by weight) of a hydroxylated polydimethylsiloxane having an average molecular weight of about 1,000; 4.2 parts (by weight) of glacial acetic acid; and 49.8 parts (by weight) of tertiary butanol was placed in a seamless aerosol can of ANS 1000 series aluminum allot having an AISI 300 series stainless steel valve. The can containing the repellent solution was heated at 250° F. for 5 hours and placed in storage 5 months then tested in the equipment as outlined in example 2. Small rivulets formed in 5 minutes and small wettable areas formed in 17 minutes.

I claim:
1. A method of treating an enclosed aluminum container to form a pinhole-free coating on the inside of the container with the steps comprising;
   a. introducing a water-repellent fluid comprising about 2 weight percent of an acetic acid neutralized copolymer of a hydroxylated polydimethylsiloxane with an average molecular weight of about 2,000 and n-(dimethoxymethylsilylisobutyl) ethylene diamine in a water and alcohol solution wherein the alcohol is selected from the group consisting of isopropanol and tertiary butanol, and
   b. heating the repellent and the enclosed aluminum container to a temperature of from about 160° to 300° F. for a time at temperature sufficient to build a coating inside the container.

2. A method as in claim 1 wherein the repellent and container is heated to a temperature of about 300° F. for 30 minutes to 2 hours.

3. A method of increasing effective film life of a rain repellent when being used to impart visibility through a transparent member during water impingement on the member, with the repellent comprising; a water and alcohol solution of an acid neutralized cationic dimethyl polysiloxane polymer containing amino functional groups in the percentages of 84 weight percent water, 14 weight percent isopropanol (99percent) and 2 weight percent of the following composition: 43 parts, by weight, of a hydroxylated polydimethylsiloxane having an average molecular weight of about 2,000; 4.2 parts, by weight, of n-(dimethoxymethylsilylisobutyl) ethylene diamine; 3 parts, by weight, of glacial acetic acid; and 49.8 parts, by weight, of tertiary butanol, the steps comprising; placing the repellent solution into an enclosed aluminum container, and heating the repellent while in the container to a temperature of from about 160° to 300° F. for a time sufficient to build a coating inside the container.

4. A method as in claim 3 wherein the repellent and enclosed aluminum container is heated to a temperature of about 300° F. for 30 minutes to 2 hours.

* * * * *